(No Model.) 2 Sheets—Sheet 1.

W. O. DUNBAR.
DUST AND LUBRICANT GUARD FOR JOURNAL BOXES.

No. 448,211. Patented Mar. 17, 1891.

WITNESSES:
John F. Rennie.
Geo. W. Appleton.

INVENTOR:
William Otis Dunbar,
By Wm. F. Appleton,
Attorney.

(No Model.) 2 Sheets—Sheet 2.
W. O. DUNBAR.
DUST AND LUBRICANT GUARD FOR JOURNAL BOXES.
No. 448,211. Patented Mar. 17, 1891.
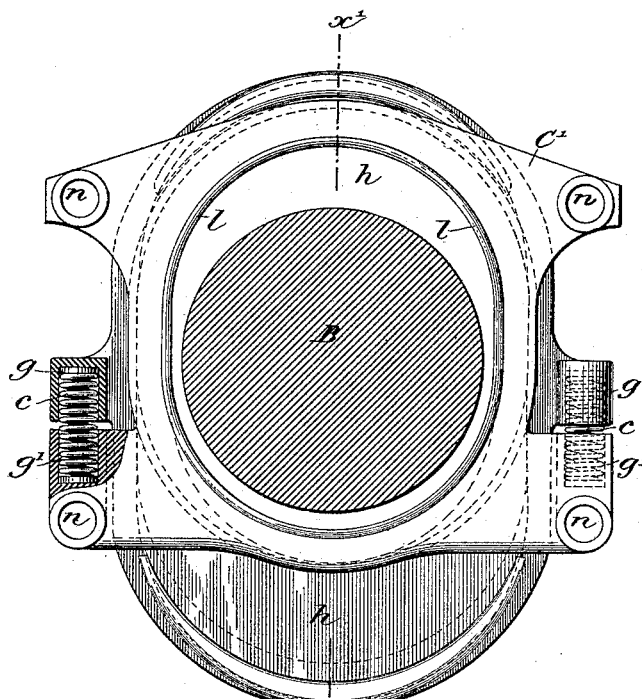
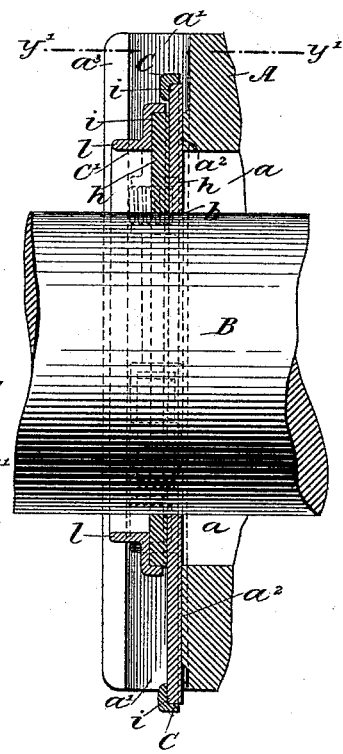
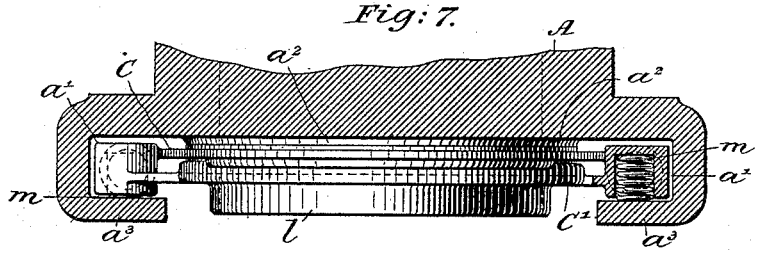
WITNESSES:
John A. Rennie
Geo. P. Appleton
INVENTOR:
William Otis Dunbar,
By Wm. H. Appleton.
Attorney.

UNITED STATES PATENT OFFICE.

WILLIAM OTIS DUNBAR, OF ALTOONA, PENNSYLVANIA.

DUST AND LUBRICANT GUARD FOR JOURNAL-BOXES.

SPECIFICATION forming part of Letters Patent No. 448,211, dated March 17, 1891.

Application filed August 26, 1890. Serial No. 363,092. (No model.)

*To all whom it may concern:*

Be it known that I, WILLIAM OTIS DUNBAR, a citizen of the United States, and a resident of Altoona, county of Blair, and State of Pennsylvania, have invented certain new and useful Improvements in Dust and Lubricant Guards for Journal-Boxes, of which the following is a specification.

My invention, while relating to dust and lubricant guards for journal-boxes generally, has reference more particularly to that form of such devices which is employed in connection with the journal-boxes of car-axles, its object being to provide a dust and lubricant guard of this character which, while insuring a tight joint being formed at all times around the axle and at the rear of the journal-box, shall be simple in construction and not liable to get out of order.

To these ends the invention consists, first, in the peculiarities of construction of the dust and lubricant guard itself; second, in the means whereby it is caused to grip the axle and thereby insure a tight joint being formed around the same; third, in the construction and arrangement of parts whereby a tight joint is not only formed around the axle, but also at the rear of the journal-box, and, fourth, in various other combinations of parts, all as will hereinafter more fully appear.

Figure 1:
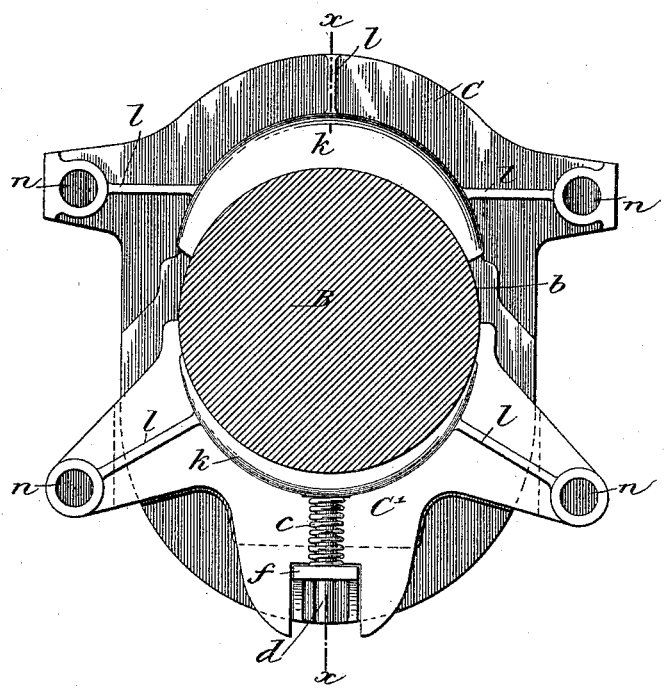
Figure 3:
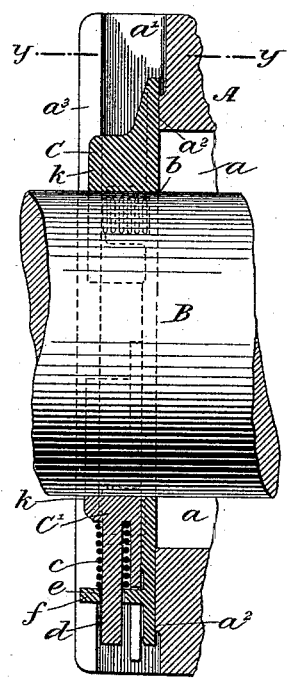
Figure 4:
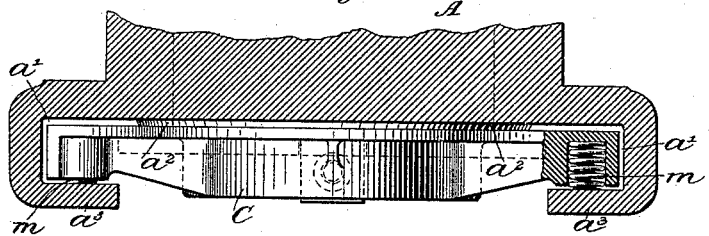
Figure 2:

Referring to the accompanying drawings, which form a part of this specification, Figure 1 is a front elevation of a dust and lubricant guard made in accordance with my invention, the same being illustrated as applied in connection with a car-axle which is shown in section; Fig. 2, an edge elevation of the same with the axle removed; Fig. 3, a vertical section of the dust and lubricant guard and rear of the journal-box, taken in the plane $x\ x$ of Fig. 1, showing in addition the car-axle in elevation; Fig. 4, a transverse section of the dust and lubricant guard and journal-box, taken in the plane $y\ y$ of Fig. 3, the rear plate being broken away to show more fully one of its co-operating springs; Figs. 5, 6, and 7, views similar to Figs. 1, 3, and 4, respectively, but illustrating a dust and lubricant guard of a slightly modified construction, Fig. 6 being taken in the plane $x'\ x'$ of Fig. 5, and Figs. 5 and 7 being taken in the plane $y'\ y'$ of Fig. 6.

In all the figures like letters are employed to designate corresponding parts.

A indicates the rear portion of a journal-box having the usual opening $a$ and pocket $a'$ formed therein, and B indicates the axle, which, entering the journal-box, rests at its outer end in a suitable bearing located therein. The journal-box here shown is of that form which is furnished with a pocket that is not only open at its bottom and provided around the opening $a$ with a slightly-projecting bearing-surface $a^2$, but has for its back two flanges $a^3\ a^3$, extending inwardly toward each other—as illustrated, for instance, in Figs. 9, 10, and 11 of Letters Patent No. 423,303, which were granted to me May 6, 1890; but any of the other ordinary or well-known forms may be employed in lieu thereof without in any way affecting my invention.

Located in the pocket $a'$ is the dust and lubricant guard, by means of which the opening $a$ in the journal-box is closed and a tight joint around the axle insured. This guard consists of the two plates C C'. The plate C is made of the proper length and breadth to cover the opening $a$, against which it is placed, and is provided at or near its center with an opening $b$, which is of the requisite size and shape to closely fit the axle when the latter is arranged therein. The plate C', on the other hand, is made of the proper dimensions to either surround a portion or the whole of said axle, as desired, and rests with its rear or back against the front of the plate C. In Figs. 1 to 4, inclusive, I have illustrated this plate C' as made of a size to surround the lower semi-circumference of the axle B alone, while in Figs. 5 to 7, inclusive, I have shown it as made of the proper length and breadth to surround the entire circumference. When the dust and lubricant guard is new, the plate C will be sufficient by itself to close the opening $a$ and form a tight joint around the axle B, and the plate C' is only employed to close up any enlargement in the opening $b$ that may afterward be occasioned by wear or otherwise. To provide for closing up such enlargement when one results, the plates C C' are constantly forced toward the axle from opposite directions. The means whereby this forcing of the plates toward the axle is effected consists of a spring or springs c, which is or are suitably applied to accomplish that result. In Figs. 1 to 4 I have shown a single spring employed for this purpose, while in the remaining figures I have illustrated a plurality of springs for accomplishing this result. When a single spring is made use of, I find it convenient to dispose it around a rod $d$, which depends from a flange or projection on the plate C' and enters an opening $e$, formed in a lug $f$, extending outwardly from the plate C. As thus arranged the upper end of the spring bears against the under side of the flange or projection on the plate C', and its lower end presses on the upper side of the lug on the plate C, and thereby forces the plates to which such parts are respectively secured in the same directions as they themselves are urged. When, on the other hand, a plurality of springs are employed, I prefer to locate them in holders or sockets $g$ $g'$, which are respectively secured to the plates C C' in such relation to each other that the holders or sockets $g$ shall be directly over the holders or sockets $g'$, with their axes in coincidence—as shown, for instance, in Fig. 5. The material out of which these plates are made may be metal, wood, vulcanized fiber, or other suitable materials, or, if preferred, a combination of two or more of these substances. In Figs. 1 to 4 they are shown as made of metal, brass or bronze being preferred, while in Figs. 5 to 7 they are made of metal with linings $h$ of vulcanized fiber or other equivalent material, which are held in recesses $i$, formed in their backs and provided with suitable openings to receive and fit the axle B when arranged therein. When the plates are made wholly of metal, they will preferably be provided upon their faces contiguous to the axle with an annular flange $k$, whereby to present a greater thickness of material to the action of such axle, and thereby reduce the rapidity with which the plates may be worn away by its action to the minimum. These flanges may also be applied in connection with the linings $h$ of the construction illustrated in Figs. 5 to 7 when they are employed; but they are not essential to either construction, and may be applied or omitted without in any way affecting the scope of the invention. Again, the plates C C' may likewise be supplied on their faces with strengthening ribs or flanges $l$, if desired, to impart greater stiffness and rigidity thereto; but these are refinements, and, like the former, may be omitted and the plates operate with efficiency. In the construction of these plates the surfaces thereof which come in contact are trued up so as to be smooth and flat, as will also be the case with the linings $h$ when employed, and with the back of the plate C and the face of the bearing-surface $a^2$, against which such plates bear; and in order to insure a tight joint being formed between these surfaces at all times I employ springs $m$, which, mounted in suitable holders or sockets $n$, bear against the inner sides of the flanges $a^3$ $a^3$, as shown, and press such surfaces tightly together. In Figs. 1 to 4 two of these holders or sockets $n$ are secured to the plate C and two to the plate C', while in Figs. 5 to 7 the entire number is secured to the plate C'; but the results of these arrangements are the same in both instances, and the plate C is not only held against the bearing-surface $a^2$ to close the opening $a$, but the plate C' is forced against the plate C.

It will thus be seen that by my construction I not only produce a dust and lubricant guard which is exceedingly simple, but one which insures both the tight closure of the opening $a$ and a close joint being formed around the axle B, despite any wear that may take place around the same.

In the foregoing I have described the best means contemplated by me for carrying my invention into practice; but I wish it distinctly understood that I do not limit myself strictly thereto, as it is obvious that I may modify the same in various ways without departing from the spirit thereof.

Having thus described my invention, what I claim as new, and desire to secure by Letters Patent of the United States, is—

1. The combination, with a journal-box provided with an opening and a pocket in its rear, and an axle B, of the two plates C C', resting side by side in said pocket and surrounding the axle, and means for not only sliding the plates on each other in opposite directions to close the joint around the axle, but also for holding the two plates pressed closely together and the plate C pressed against the front of the pocket to close the opening therein, substantially as described.

2. The combination, with the plate C, provided with an opening which is adapted to receive and fit a cylindrical axle when arranged therein, and with a lug $f$, having an opening $e$, of the plate C' for co-operating with the former, provided with a rod $d$, and a spring surrounding said rod and serving to press the plates in opposite directions, substantially as described.

3. The combination, with a journal-box provided with an opening and a pocket in its rear, and an axle entering the same, of a plate C, provided with an opening which is adapted to receive and fit such axle, a plate C', resting against the side of the former plate, and means for both holding the two plates pressed toward the axle from opposite directions and the plate C pressed against the front of the pocket, substantially as described.

4. The combination, with a journal-box provided with an opening and a pocket in its rear, and an axle B, of the two plates C C', resting side by side in said pocket and surrounding the axle, and springs contained in such plates for not only sliding the plates on each other in opposite directions to close the joint around the axle, but also for holding the two plates pressed closely together and the plate C pressed against the front of the pocket to close the opening therein, substantially as described.

5. The combination, with a journal-box provided with an opening and a pocket in its rear, of the plate C, resting in said pocket and provided with the holders or sockets $n$, the plates C', resting against the former plate and provided with the holders or sockets $n$, and the springs $m$, located in said holders or sockets to hold the plates pressed closely together and the plate C pressed against the front of the pocket to close the opening $a$, substantially as described.

6. The combination, with an axle B and the plates C C', provided with the recesses $i$, of the linings $h$, arranged in such recesses and provided with openings to receive and fit the axle, and devices whereby the plates may be held pressed toward the axle from opposite directions by spring-pressure, substantially as described.

7. The combination, with a journal-box provided with an opening $a$ and a pocket $a'$ in its rear, an axle entering said box, and the plates C C', provided with recesses in their backs, of the linings $h$, of vulcanized fiber, arranged in said recesses and provided with openings to receive and fit the axle when arranged therein, and devices whereby the plates are pressed toward the axle from opposite directions and forced together and against the front of the pocket by spring-pressure, substantially as described.

In testimony whereof I have hereunto set my hand this 25th day of August, 1890.

WILLIAM OTIS DUNBAR.

Witnesses:
P. F. SMITH, Jr.,
WM. H. APPLETON.